US007749409B2

(12) United States Patent
Hansel et al.

(10) Patent No.: US 7,749,409 B2
(45) Date of Patent: Jul. 6, 2010

(54) FATLIQUORING AGENTS FOR THE FLAME-RETARDANT TREATMENT OF LEATHER

(75) Inventors: Jan-Gerd Hansel, Köln (DE); Otto Mauerer, Leichlingen (DE); David Burgess, Worms (DE); Karl-Heinz Wolf, Worms (DE)

(73) Assignees: Lanxess Deutschland GmbH, Leverkusen (DE); Trumpler GmbH & Co. Chemische Fabrik, Worms (DE)

( * ) Notice: Subject to any disclaimer, the term of this patent is extended or adjusted under 35 U.S.C. 154(b) by 0 days.

(21) Appl. No.: 11/924,746

(22) Filed: Oct. 26, 2007

(65) Prior Publication Data

US 2008/0104766 A1 May 8, 2008

(30) Foreign Application Priority Data

Oct. 27, 2006 (DE) ...................... 10 2006 050 795

(51) Int. Cl.
*C14C 9/02* (2006.01)
*C09K 21/14* (2006.01)

(52) U.S. Cl. .................... 252/601; 252/8.57; 8/94.1 R; 8/94.15; 8/94.18

(58) Field of Classification Search ................ 8/94.1 R, 8/94.1 P, 94.15, 94.18; 252/601, 8.57
See application file for complete search history.

(56) References Cited

U.S. PATENT DOCUMENTS

| | | | | | |
|---|---|---|---|---|---|
| 2,635,060 | A | * | 4/1953 | Cheronis et al. ............ | 428/540 |
| 2,798,858 | A | * | 7/1957 | Brown, Jr. .................. | 524/837 |
| 3,419,344 | A | | 12/1968 | Jones | |

FOREIGN PATENT DOCUMENTS

| | | | | |
|---|---|---|---|---|
| GB | 434 423 | | | 2/1934 |
| GB | 2 084 622 | A | | 4/1982 |
| RO | 79726 | | * | 7/1982 |

* cited by examiner

*Primary Examiner*—Lorna M Douyon
*Assistant Examiner*—Amina Khan
(74) *Attorney, Agent, or Firm*—Norris McLaughlin & Marcus, P.A.

(57) ABSTRACT

The present invention relates to fatliquoring agents for leathers, skins or hides, which contain neutral halogen-free organic phosphorus compounds, and the use of such fatliquoring agents for the flame-retardant treatment of leather and a process for fatliquoring in the production of flame-retardant leather, skin or hides.

4 Claims, No Drawings

FATLIQUORING AGENTS FOR THE FLAME-RETARDANT TREATMENT OF LEATHER

The present invention relates to fatliquoring agents for leathers, skins or hides, which contain neutral halogen-free organic phosphorus compounds, and the use of such fatliquoring agents for the flame-retardant treatment of leather, a process for fatliquoring for the production of flame-retardant leather, skin or hides, and a flame-retardant leather, skin or hide.

BACKGROUND OF THE INVENTION

The flameproofing requirements with regard to construction materials, components and materials are extensive. Thus, for example, construction materials can be classified according to DIN 4102, components for electrical equipment according to UL 94 or IEC-60695-2, components for railway vehicles according to DIN 5510 and furniture according to BS 5852 and can be provided with an appropriate flame-retardant treatment for their application. For example, the treatment of aircraft (e.g. FAR 25.853) or ships (e.g. IMO A.652 (16)) has to meet particular requirements. An overview of numerous tests and requirements is given, for example, by Jürgen Troitzsch, "Plastics Flammability Handbook", 2004, Carl Hanser Verlag, Munich.

In addition, the fireproofing requirements are constantly increasing. Thus, for example, new European standards which are intended to replace the existing national test standards set substantially higher flameproofing requirements. Thus, the SBI test (EN 13823), for example, requires not only the fire behavior but also the smoke density be taken into account. The new standard proposed for a railway vehicle (prEN 45545) takes into account, for example, fume density and fume toxicity. Requirements regarding the fume toxicity, which is often determined by measurement of, inter alia, hydrogen halide concentrations in the fume, can, for example, make the use of tried and tested halogen-containing flameproofing agents impossible. This means that, for many fields of use, a tried and tested and functionally flameproof treatment has to be revised with regard to new requirements in line with standards.

In addition to purely fire aspects, such as, for example, ignitability or flammability, which a component, construction material, material or additive has to meet, there are also further properties which have to be taken into account. Thus, the term fogging which is customary in the automotive industry (e.g. DIN EN 14288) describes emissions which are released by materials and can be deposited in the passenger compartment. The use of such volatile additives is likewise to be avoided.

Further requirements which not only result from test standards but are also required by customers or end users are: halogen-free, nonvolatile, cannot be washed out, economical, usable without changing the process in production, no influence on the properties of the end product.

If leather is used in vehicles, for example as seat covering, or in the equipment of buildings, for example as seating, it must meet the respective fireproof requirements. At the same time, the appearance, hand, and odor, i.e. the organoleptic perception of the natural material leather, should not be excessively influenced on treatment with flameproofing agents. In addition, the flame-retardant finishing, i.e. the incorporation of a flameproofing agent into the leather, should set no particular requirements with regard to the customary production and processing of the leather. The additives required for flameproofing the leather should be safe and should not necessitate any special requirements with regard to handling or processing.

Flame-retardant leathers are already known. However, the finishes described have the disadvantage that they are either halogen-containing or can be washed out. Flame-retardant leather finishes based on halogen-containing alkyl or aryl phosphates are disclosed in GB 2 084 622 A. The use of inorganic salts, such as sodium bromide and boric acid derivatives, is described in K. Donmez, W. E. Kallenberger, *J. Am. Leather Chem. Assoc.,* 1992, 87, 1-19. In order to provide leather with flame-retardant treatment, a separate operation is required. Such flame-retardant finishes adversely affect the properties of the leather and, owing to the halogen content, cause high fume densities and fume toxicities.

GB 434,423 describes a leather finish based on cellulose derivatives which contains tricresyl phosphate and other substances as softeners for the finish, in order to avoid embrittlement and flaking of the decorative protective layer. The flame retardance of the leather is, however, not a subject of this patent.

U.S. Pat. No. 2,635,060 describes fatliquoring emulsions which contain, for example, tricresyl phosphate in small amounts as a softener in combination with other softening substances, such as, for example, dibutyl phthalate. In addition to numerous advantages which are ascribed to such an emulsion, the flame retardance of the leather which was treated with such a phosphate-containing emulsion is on the other hand absent. Only better softening effect of a softening combination is mentioned as an advantage of such softener combinations. Experience shows that, if they are used as flameproofing agents, for example in plastics or textiles, organic phosphates must be used in substantially higher doses than described in the patent. Formulations for imitation leather based on flexible PVC, as described in Becker/Braun, Kunststoff Handbuch Polyvinylchlorid [Plastics Handbook Polvinyl chloride], Vol. 2/1, Carl Hanser Verlag, Munich, Vienna, 1986, may be mentioned as an example here. Substantial flame retardance is present in the case of PVC imitation leather provided with a flame retardant treatment using phosphoric acid esters only at a content of 20% of phosphoric acid esters. In practice, the content is even higher.

A process for the flame-retardant treatment of leather, in which organic phosphate esters and tetrakis(hydroxyalkyl) phosphonium halides are used, is described in U.S. Pat. No. 3,419,344. This process has several disadvantages. The flame retardance, which is distinguished in particular by self-extinguishing and absence of continued glowing of the ignited leather, is accordingly achieved only if the leather is subjected to a complicated, two-stage aftertreatment. In the first stage, the leather is treated with a tetrakis(hydroxyalkyl)phosphonium halide for retanning and in the second stage with an organic phosphoric acid ester. It is expressly pointed out that two operations are required for this purpose. Moreover, the aim of achieving a halogen-free finish cannot be achieved with the use of tetrakis(hydroxyalkyl)phosphonium halides.

Flame-retardant leather which contains halogenated organic phosphates is described in GB 2 084 622 A. In every case, halogen-containing compounds are required for the flame-retardant treatment of the leather.

The object was to find auxiliaries and processes for the production of a flame-retardant leather which is self-extinguishing and reacts without continued glowing to the action of an ignition flame for a limited time. The flame-retardant treatment should be economical and based on comparatively cheap as well as accessible products. The flame-retardant finish or the auxiliaries used for this purpose should be halogen-free. The properties of the leather should not be adversely affected. The incorporation should be possible without special operations, as described in U.S. Pat. No. 3,419,344, in the course of the customary further processing of the raw hide.

SUMMARY OF THE INVENTION

Surprisingly, it has been found that a fatliquoring agent which contains a neutral halogen-free organic phosphorus compound which is used in the customary processing of a leather meets all requirements. This invention relates to a fatliquoring agent containing the components A) modified natural oil, B) neutral oil, C) coemulsifier and D) neutral halogen-free organic phosphorus compound.

The fatliquoring agent according to the invention may furthermore optionally contain solvent as component E) and water as component F). The components A) to E) are described in more detail in the following.

The modified natural oil of component A is a product based on fats and oils of vegetable or animal origin which was modified by known processes, such as, for example oxidation, sulphiting or sulphating. Fats and oils used are in particular glycerides of natural fatty acids with a sufficient proportion of unsaturated acids. Such fats and oils having an iodine number of about 10 to about 200, preferably about 30 to about 120, are suitable.

In a preferred embodiment of the invention, the modified natural oil is sulphited natural oil selected from the group consisting of the sulphited marine animal oils, particularly preferably sulphited herring oil, sardine oil, capelin oil, etc. or from the group consisting of the sulphited vegetable oils, particularly preferably sulphited rapeseed, sunflower, nut, olive, castor or soya oil. The sulphiting of these oils is effected according to a classical procedure known from the corresponding literature, with prior oxidation. Very particularly preferred oils from the groups mentioned are the vegetable oils since, in comparison with the fish oils, the result is substantially less yellowing and a more pleasant odor of the leather produced therewith.

Any desired mixture of the abovementioned modified oils may also be used as modified natural oils.

The neutral oils of component B) which are to be used are synthetic and/or native oils. Preferred oils are liquid paraffins, alkylbenzenes, triglycerides, fish oil, colza oil, lecithins and wool fat.

The group consisting of the natural oils is particularly preferred since they generally have a more advantageous combustion behavior than synthetic oils.

Suitable coemulsifiers of component C) are substances which impart the desired stability to the emulsion of the components of the fatliquoring agent and do not adversely affect the combustion behavior of the leathers. Nonionogenic emulsifiers or anionic surfactants are preferably used.

Particularly preferred coemulsifiers are alkoxylated aliphatic $C_6$- to $C_{24}$-alcohols having 4 to 100 alkylene oxide units, particularly preferably ethoxylated oxo alcohols, triglycerides, phosphoric acid esters, ether sulphates or alkanesulphonates. Particularly preferred products from the group consisting of the anionic surfactants are fatty acid sarcosides, in particular N-oleylsarcoside, N-stearylsarcoside or N-laurylsarcoside, oleyl- or tallow fat-based phosphoric acid esters having a low degree of ethoxylation and 3 to 5 mol of ethylene oxide or coconut oil- or tallow fat-based sulphosuccinates which are unethoxylated or have a low degree of ethoxylation.

The neutral halogen-free organic phosphorus compound of component D) is selected from the substance classes consisting of the phosphanes, phosphane oxides, phosphane sulphides, the esters of organically substituted phosphinous acids, phosphonous acids, phosphinic acids and phosphonic acids and the esters of phosphorous acid and of phosphoric acid.

By the term "neutral" is meant that the majority of the molecules of the phosphorus compound carries no positive or negative charge and that the phosphorus compound is not a Bronsted acid having a $pK_A$ value of >5 and not a Bronsted base having a $pK_B$ value of >5.

The term "halogen-free" means that the phosphorus compound does not contain the elements fluorine, chlorine, bromine and/or iodine.

In a preferred embodiment of the invention, the fatliquoring agent contains a neutral halogen-free organic phosphorus compound of the formula (I)

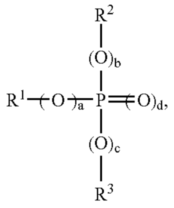

(I)

in which $R^1$ and $R^2$ independently of one another, represent $C_1$- to $C_8$-alkyl, $C_1$- to $C_4$-alkoxyethyl, optionally $C_1$- to $C_4$-alkyl-substituted $C_6$- to $C_{10}$-aryl, or $R^1$ and $R^2$ together represent an optionally $C_1$- to $C_4$-alkyl-substituted or optionally arbitrarily fused ring having 2 to 20 carbon atoms altogether, $R^3$ represents $C_1$- to $C_8$-alkyl, $C_1$- to $C_4$-alkoxyethyl, optionally $C_1$- to $C_4$-alkyl-substituted $C_6$- to $C_{10}$-aryl or, if c is 0, represents H and a, b, c and d, independently of one another, represent 0 or 1.

In a particularly preferred embodiment of the invention, the fatliquoring agent contains, as a neutral halogen-free organic phosphorus compound, 6H-dibenz[c,e][1,2]oxaphosphorine 6-oxide and its derivatives, dimethyl methanephosphonate, dimethyl propanephosphonate, diethyl ethanephosphonate, triethyl phosphate, tri-n-butyl phosphate, triisobutyl phosphate, trioctyl phosphate, diphenyl octyl phosphate, triphenyl phosphate, diphenyl cresyl phosphate, tricresyl phosphate, isopropylated aryl phosphates, tert-butylated aryl phosphates, resorcinol bis(diphenylphosphate) or bisphenol A bis (diphenylphosphate).

The fatliquoring agent according to the invention may also contain any desired mixture of said neutral halogen-free organic phosphorus compounds.

Suitable solvents of component E) are products which have as little an adverse effect as possible on the combustion behavior of the fatliquoring agent and of the leather, i.e. products having as high a flashpoint and boiling point as possible and as small a vapor pressure as possible. Solubilizers from the group consisting of the glycols, such as hexylene glycol, butyl glycol, butyl diglycol, 1,2-propylene glycol and monoethylene glycol, are preferably used for this purpose.

The fatliquoring agent according to the invention contains the components described preferably in the following composition:

A) modified natural oil: 20 to 50% by weight, preferably 25 to 40% by weight,

B) neutral oil: 5 to 20% by weight, preferably 10 to 15% by weight,

C) coemulsifier: 5 to 20% by weight, preferably 5 to 15% by weight,

D) neutral halogen-free organic phosphorus compound: 5 to 25% by weight, preferably 10 to 20% by weight.

The components E) and/or F) optionally to be used in alternative or particularly preferred embodiments are present as follows:

E) solvent: 0.1 to 10% by weight, preferably 2 to 5% by weight

F) water: 0.1 to 40% by weight, preferably 10 to 30% by weight.

The fatliquoring agents according to the invention can be prepared by simply stirring together said components in any desired sequence at temperatures of 10 to 90° C., preferably 15 to 60° C. Further suitable additives known to the person skilled in the art may also be present. The active content of the fatliquoring agents is 60% by weight to 80% by weight and the pH of their 10% strength emulsion is pH 6.5 to pH 7.5. The fatliquoring agents obtained are liquid and clear to slightly turbid at room temperature and they have an excellent shelf-life. The fatliquoring agents according to the invention can be used in the production and/or treatment of leathers and hides. The invention therefore also relates to the use of the described fatliquoring agents according to the invention in leather production. Use thereof serves for softening the leather, for increasing its fullness and strength, for flame-retardant finishing and for protective effect against moisture, dirt and chemical influences from the outside.

The invention finally also relates to a process for the fatliquoring of leathers, skins and hides by treatment with an aqueous liquor, which is characterized in that the aqueous liquor contains a fatliquoring agent containing the components A) modified natural oil, B) neutral oil, C) emulsifier and D) neutral halogen-free organic phosphorus compound, and optionally E) solvent and F) water.

The components of the fatliquoring agent used in the process according to the invention are described above. In addition to such components, further additives known to a person skilled in the art may optionally be present, such as, for example, preservatives, biocides, acids, bases or buffers for adjusting the pH.

Any desired leather and skin varieties which have been tanned by any desired customary tanning processes, mainly those which have been subjected to vegetable, mineral, synthetic or combined tanning (e.g. chrome-tanned, zirconium-tanned or aluminium-tanned) or have been correspondingly retanned, in general as are used for customary fatliquoring processes, can be treated by the process according to the invention. Specifically, the following preferred leather varieties may be mentioned: grain leather, such as, for example, Nappa from sheep, goat or calf, boxcalf leather or side leather and suede leather, such as, for example, suede from sheep, goat or calf leather and in particular hunting leather, split suede from cattle hides or optionally calf hides and nubuck leather; furthermore fur suede and furs for clothing.

Optionally, the leathers mentioned may have been dyed in a separate bath prior to the fatliquoring according to the invention. The fatliquoring may also take place after a dyeing from aqueous medium in the same aqueous bath.

The fatliquoring according to the invention may take place by any desired treatment methods customary per se, expediently by exhaustion processes, in one stage or a plurality of stages. Thus, for example, a main fatliquoring can be preceded by a preliminary fatliquoring and/or followed by refatliquoring. Furthermore, the fatliquoring can be effected before, during or after the retanning or before, during or after the dyeing.

In the process according to the invention, the fatliquoring agent is used in an amount of 0.2 to 25% by weight, preferably 2 to 16% by weight, based on the shrink weight of the leather. The aqueous liquors advantageously have a pH of about 2 to about 9, preferably 4 to 7. pH is advantageously adjusted with customary acids, bases and/or buffers, preferably with formic acid or ammonium or alkali metal carbonate. For the fatliquoring, the leather is treated with these aqueous liquors at temperatures between 20 and 70° C., preferably between 30 and 60° C., for 20 to 150 min, preferably from 30 to 120 min. Finally, a pH of 3 to 5, preferably 3.5 to 4.5, is established by adding customary acids. Optionally, further treatment steps may be effected, such as, for example, a treatment for water repellence or the treatment with metal salts.

The fatliquoring according to the invention gives optimally fatliquored leathers and skins which are distinguished by an outstanding silky soft hand. They also have the general fastnesses desired for leather and good tensile strength and suppleness. In addition, an improved flame-retardant effect can be achieved by the neutral halogen-free organic phosphorus compound present in the fatliquoring agent, so that no or at least less possibly unsafe halogen compounds are required as flameproofing agents.

The invention is explained in more detail with reference to the following examples without having any intention to limit the invention thereby. The percentages denote percentages by weight. In the examples for leather fatliquoring, the stated percentages are based on the shrink weight of the leather when a solution concentration is unambiguously meant. The dilutions are stated in volume with water.

EXAMPLES

TABLE 1

Constituents of the fatliquoring agent

| Component | Function | Description |
|---|---|---|
| A | Modified natural oil | Sulphited vegetable oil based on sunflower, soya and rapeseed oil |
| B | Neutral oil | Vegetable oil |
| C | Coemulsifier | Anionic surfactant |
| D 1 | Phosphorus compound | Diphenyl cresyl phosphate (CAS Reg. No. 26444-49-5) |
| D 2 | Phosphorus compound | Triethyl phosphate (CAS Reg. No. 78-40-0) |
| E | Solvent | Propylene glycol |
| F | Water | |

TABLE 2

Composition of the fatliquoring agents according to the invention (Examples B 1 to B 5) and of the comparative examples (C 1 and C 2) in % by weight

| Example | B 1 | B 2 | B 3 | B 4 | B 5 | C 1 | C 2 |
|---|---|---|---|---|---|---|---|
| A | 39.2 | 37.1 | 33.0 | 36.4 | 32.3 | 41.2 | 40.4 |
| B | 14.7 | 13.9 | 12.4 | 13.6 | 12.1 | 15.5 | 15.2 |
| C | 11.8 | 11.1 | 9.9 | 12.7 | 11.3 | 12.4 | 12.1 |
| D 1 | 5.0 | 10.0 | 20.0 | 0.0 | 0.0 | 0.0 | 2.0 |
| D 2 | 0.0 | 0.0 | 0.0 | 10.0 | 20.0 | 0.0 | 0.0 |
| E | 4.9 | 4.6 | 4.1 | 4.5 | 4.0 | 5.2 | 5.1 |
| F | 24.5 | 23.2 | 20.6 | 22.7 | 20.2 | 25.8 | 25.3 |

For the preparation of the fatliquoring agents, the components stated in Table 1 were stirred with one another in the ratio stated in Table 2 at 25° C. until virtually clear emulsions had formed.

Carrying Out the Leather Fatliquoring

In a customary wet finishing process, chrome-tanned cattle hides (wet blue) having a shaved thickness of 1.5 mm were washed, neutralized, retanned, washed and dyed. Thereafter, the leather was treated in a retanning drum at 55° C. for 90 min to 120 min in a liquor comprising 100% by weight of water and 15% by weight of a fatliquoring agent of Examples B 1 to B 5 or Comparative Examples C 1 to C 2. Acidification to a pH of 3.8 was then effected with 1% by weight of formic acid (85% strength, diluted 1:5 with water). After 20 min, the liquor was completely exhausted and was discharged. Washing was effected with 200% by weight of water at 35° C. for 10 min, the liquor was discharged and the drum was unloaded. The leathers thus obtained was stored overnight and then set out, vacuum dried, hung out to dry, conditioned and stacked.

Excellent soft leathers having an extremely pleasant soft hand were obtained. The leathers produced using the fatliquoring agents of Examples B 1 to B 5 or of Comparative Examples C 1 to C 2 were not distinguishable with respect to appearance, hand and odor.

Determination of the Flame Retardance

The fire test of the leather samples was carried out on the basis of the small burner test according to DIN 4102 part 1. The purpose of the test according to DIN 4102-1: 1998-05 section 6.2 was the classification of construction materials on the basis of their fire behavior. The test in the fire blocks according to DIN 4102-1: 1998-05 comprised construction materials which are defined in DIN 4102-1: 1989-05 section 1.1. The B2 test according to DIN 4102-1: 1989-05 section 6.2 was used to determine the construction material class B2 (on passing the test) or B3 (on failing the test).

Two specimens each (90 mm×190 mm) for Examples B 2 to B 5 and C 1 in Table 3 were tested, each test specimen having a flame applied or being tested at both ends. In each case the mean values of the four tests were used for the assessment.

For Examples B 1 to B 2 and C 1 to C 2 in Table 4, two times five test specimens (90×190 mm) were tested. Five leather samples were cut longitudinally and five transversely from the blanket and were conditioned for 24 h at 23° C. and 50% relative humidity before the fire test. Each test specimen had a flame applied or was tested at both ends. In each case the mean values of the two times five tests were used for the assessment.

The test specimens were positioned vertically and in each case a 2 cm long ignition flame was applied at the lower edge for 15 s at an angle of 45°. Thereafter, the ignition flame was removed and the afterburning time and the afterglowing time were noted. In the case of the samples with Examples B 2 to B 5 and C 1 in Table 3, any glowing which occurred was extinguished after 5 min and the sample length and width destroyed by the fire were determined.

In the case of Example B 1 to B 2 and C 1 to C 2 in Table 4, any glowing which occurred was extinguished after 1 min and the sample length and width destroyed by the fire were determined.

TABLE 3

Fire properties (mean values) of leather samples for comparison of fatliquoring preparations comprising different phosphorus compounds

| Example | C 1 | B 2 | B 3 | B 4 | B 5 |
|---|---|---|---|---|---|
| D 1 (% by weight in fatliquoring agent) | 0 | 10 | 20 | 0 | 0 |
| D 2 (% by weight in fatliquoring agent) | 0 | 0 | 0 | 10 | 20 |
| Afterburning time (s) | 33 | 1 | 3 | 17 | 30 |
| Afterglowing time (s) | 218 | 0 | 0 | 199 | 253 |
| Combusted length (mm) | 26 | 6 | 9 | 20 | 20 |
| Combusted width (mm) | 30 | 21 | 25 | 30 | 29 |

TABLE 4

Fire properties (mean values) of leather samples for comparison of fatliquoring preparations comprising different concentrations of phosphorus compounds

| Example | C 1 | C 2 | B 1 | B 2 |
|---|---|---|---|---|
| D 1 (% by weight in fatliquoring agent) | 0 | 2 | 5 | 10 |
| Afterburning time, longitudinal (s) | 13.7 | 18.4 | 3.3 | 2.1 |
| Afterburning time, transverse (s) | 16.1 | 14.8 | 2.5 | 2.9 |
| Afterglowing time, longitudinal (s) | 24.0 | 19.0 | 0 | 0 |
| Afterglowing time, transverse (s) | 30.0 | 24.0 | 5.5 | 0 |
| Combusted length, longitudinal (mm) | 10.8 | 23.8 | 5.3 | 7.0 |
| Combusted length, transverse (mm) | 12.7 | 14.9 | 5.1 | 7.1 |
| Combusted width, longitudinal (mm) | 22.0 | 32.5 | 16.0 | 21.5 |
| Combusted width, transverse (mm) | 19.0 | 22.4 | 18.6 | 19.5 |

The results of the fire tests show that fatliquoring preparations which contain a neutral halogen-free organic phosphorus compound improve the flame retardance of the leather. This is evident from the fact that the leather samples produced using the fatliquoring agents according to the invention burn on average for a shorter time after ignition and suffer less damage than the samples produced using the fatliquoring agents of the comparative examples.

The improvement in the flame retardance is achieved solely by the customary treatment of the leather with the fatliquoring agent according to the invention. Special treatments of the leather or additional operations are not required.

The properties of the leather are not adversely affected by the use of the fatliquoring preparation according to the invention. Rather, further advantages arise out of the use in leather, such as, for example, softness and fullness and a pleasant, silky hand.

What is claimed is:

1. A fatliquoring agent for the production and/or treatment of flame-retardant leathers, skins and hides, said fatliquoring agent comprising:

A) a modified natural oil present in an amount of 20 to 50% by weight;

B) a neutral oil present in an amount of 5 to 20% by weight;

C) a coemulsifier present in an amount of 5 to 20% by weight; and

D) at least one neutral halogen-free organic phosphorus compound present in an amount of 5 to 20% by weight;

wherein all percentages by weight wherein the neutral halogen-free organic phosphorus compound is at least one phosphorus compound selected from the group consisting of 6H-dibenz[c,e][1,2]oxaphosphorine 6-oxide and its derivatives, dimethyl methanephosphonate, dimethyl propanephosphonate, diethyl ethanephosphonate, triethyl phosphate, tri-n-butyl phosphate, triisobutyl phosphate, trioctyl phosphate, diphenyl octyl phosphate, triphenyl phosphate, diphenyl cresyl phosphate, tricresyl phosphate, isopropylated aryl phosphates, tert-butylated aryl phosphates, resorcinol bis (diphenylphosphate) and bisphenol A-bis(diphenylphosphate) and are based on a total weight of the fatliquoring agent.

2. An aqueous liquor comprising a fatliquoring agent according to claim 1.

3. A process for producing and/or treating a leather, skin or hide having a flame-retardant, halogen-free finish, said process comprising treating the leather, skin or hide with an aqueous liquor comprising a fatliquoring agent according to claim 1.

4. A process according to claim 3, which involves producing and/or treating flame-retardant leather, wherein the aqueous liquor comprises the fatliquoring agent in an amount of 0.2 to 25% by weight, based on a shaved weight of the leather to be produced and/or treated, the aqueous liquor has a pH of 2 to 9 during or after retanning, and the process further comprises subjecting the leather to the aqueous liquor for a period of time and thereafter establishing a pH of 3 to 5.

* * * * *